Aug. 28, 1923.
P. R. E. LEHMANN
EXPANSIBLE CORE
Filed Nov. 29, 1921
1,466,366
2 Sheets-Sheet 2
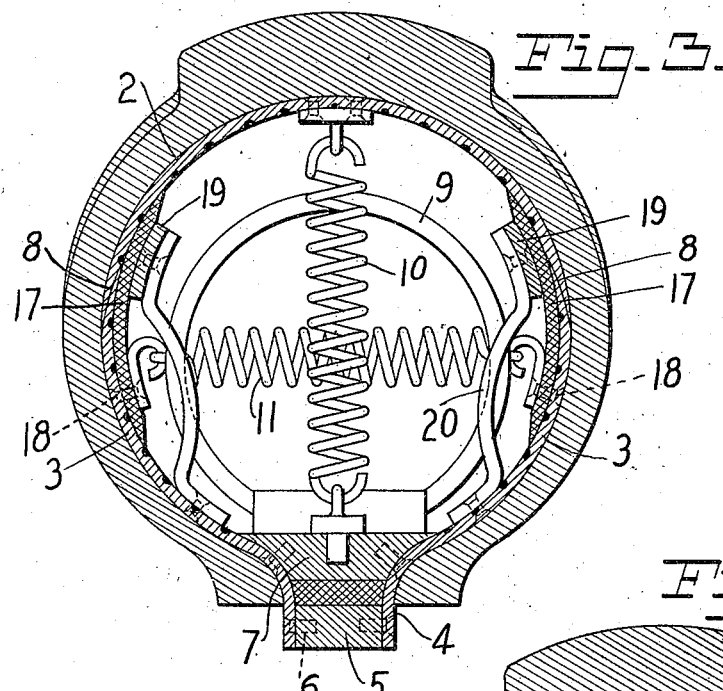
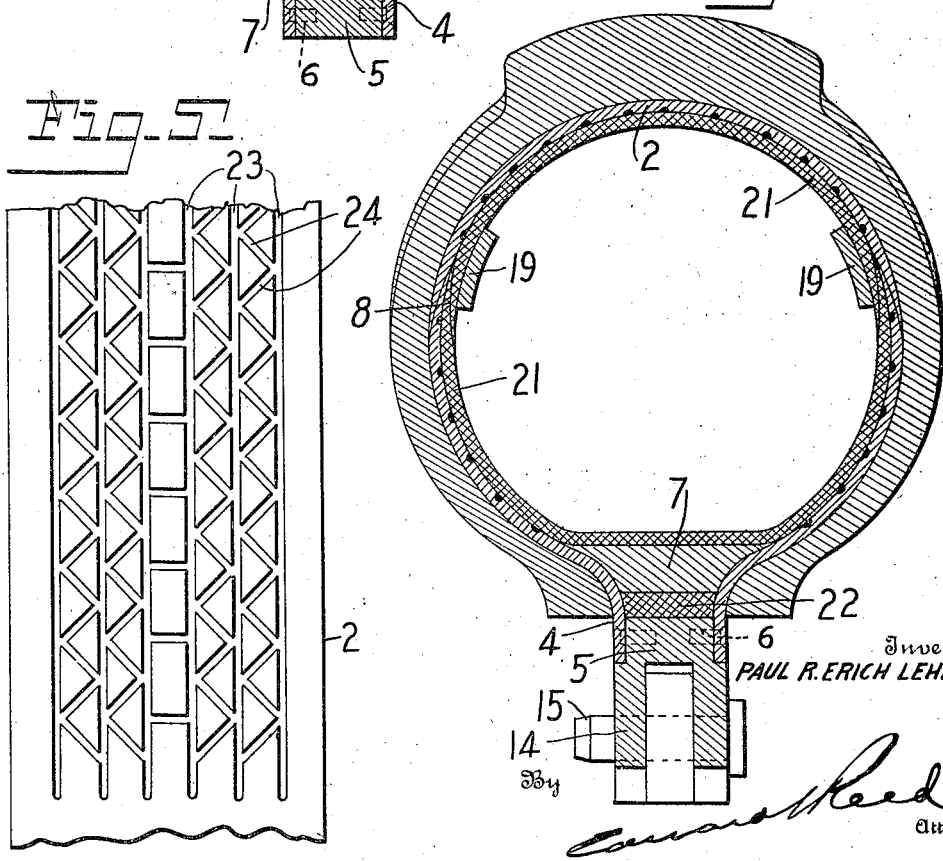
Inventor
PAUL R. ERICH LEHMANN
By
Attorney Patented Aug. 28, 1923.

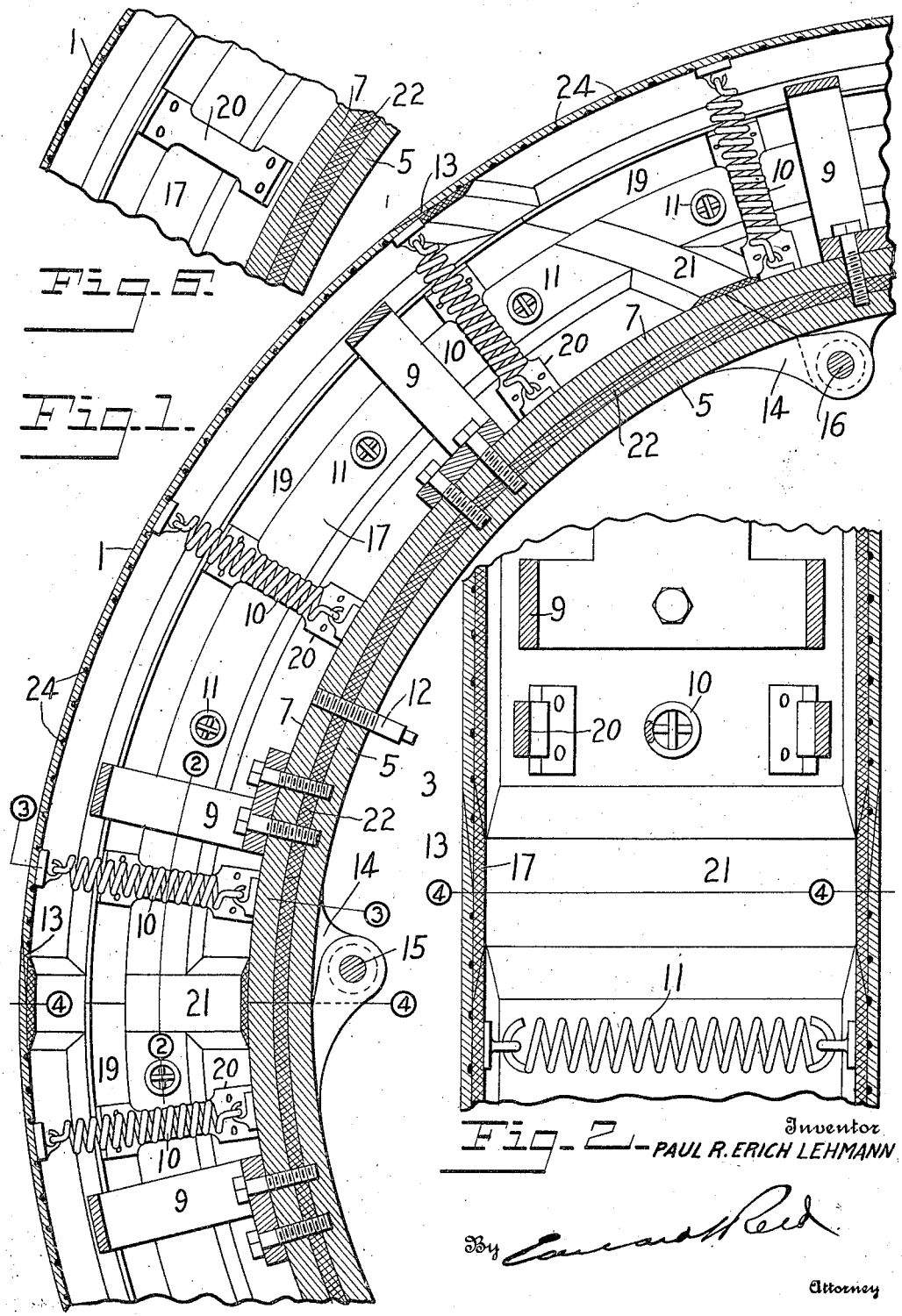

1,466,366

UNITED STATES PATENT OFFICE.

PAUL R. ERICH LEHMANN, OF DAYTON, OHIO.

EXPANSIBLE CORE.

Application filed November 29, 1921. Serial No. 518,654.

*To all whom it may concern:*

Be it known that I, PAUL R. ERICH LEHMANN, a citizen of the United States, residing at Dayton, in the county of Montgomery and State of Ohio, have invented certain new and useful Improvements in Expansible Cores, of which the following is a specification, reference being had therein to the accompanying drawing.

This invention relates to an expansible metallic core for curing automobile tires and the like.

One object of the invention is to provide such a core which will be so constructed that adequate expansion may be secured by introducing fluid under pressure into the interior thereof.

A further object of the invention is to provide such a core with means for automatically contracting the same when the internal pressure is relieved.

A further object of the invention is to provide such a core comprising a sectional, collapsible casing having means for rendering the joints fluid tight without interfering with the expansibility of the casing.

Other objects of the invention will appear as the device is described in detail.

In the accompanying drawings Fig. 1 is a longitudinal sectional view taken centrally of a portion of an annular core embodying my invention; Fig. 2 is a sectional view taken on the line 2—2 of Fig. 1; Fig. 3 is a transverse sectional view taken on the line 3—3 of Fig. 1; Fig. 4 is a transverse sectional view taken on the line 4—4 of Fig. 1; Fig. 5 is a detail view of a portion of the inner surface of the casing; and Fig. 6 is a detail view of one of the springs acting on the packing for the joints in the casing.

In these drawings I have illustrated one embodiment of my invention and have shown the same as comprising a casing 1 adapted to fit within an automobile tire. To this end the casing is substantially circular in cross section and is curved about a longitudinal axis. When the core is used for curing an automobile tire as a whole it is annular in form and this annular core consists of a series of relatively short segmental sections assembled in annular form but separable to permit the core to be inserted in and removed from the tire. It will be understood, however, that a single segmental section of the casing may, by closing the ends thereof, be used for vulcanizing repairs on the tire and when so used will constitute a core within itself.

The casing 1 is divided longitudinally into a plurality of sections which are movable relatively one to the other to permit of the contraction and expansion of the casing. In the present instance the casing is divided along each side so that it consists of three sections, an outer, or tread, section 2, and inner side sections 3. The inner sections 3 are provided with portions 4 arranged between and extending beyond the beads of the tire and these portions are rigidly secured to a supporting structure 5, such as a bar having a portion extending between the edge portions 4 of the sections 3 of the casing and rigidly secured to the edge portions 4, as by means of screws 6. Preferably, a reinforcing bar 7 is arranged between the inner portion of the side members 3 within the casing and is shaped to correspond to the shape of the beads of the tire and this reinforcing bar 7 serves to support the adjacent portions of the casing against the pressure of the exterior molds within which the core is cured. The upper portions of the side sections 3 of the casing are unsupported and free to move relatively to the supporting structure 5 and the reinforcing structure 7. The joints between the portions 2 and 3 of the casing overlap and in order to avoid ridges on the outer wall of the casing the edges are beveled, or knife edged, as shown at 8, the arrangement of the joint being such that when the casing is in its fully expanded position the exterior surface of the casing will be smooth at the joints.

The sections 2 and 3 being relatively movable and the edges of the section 2 overlapping the respective edges of the sections 3 it will be apparent that the section 2 and the outer edges of the sections 3 can be moved inwardly, thus contracting the casing. This contraction of the casing, that is, the inward movement of the sections, is controlled by suitable stops, or gages, here shown as a series of rings 9, rigidly secured to the reinforcing member 7. The inward, or contracting movement is imparted to the sections 2 and 3 by means of springs and in the present arrangement I have shown a coiled spring 10 connected at one end to the section 2 of the casing and at its other end to the reinforcing bar 7, the arrangement of this spring being such that it will tend to move the section 2 toward the gages 9. A second coil spring 11 extends transversely to the spring 10 and is connected at its ends with the side sections 3 and tends to move the upper edges of these sections inwardly toward the gages 9. Consequently, when there is no pressure within the casing it will be automatically contracted by the springs, and the sections will be held in engagement with the gages 9. To expand the casing, fluid under pressure, preferably steam or air, is introduced into the casing, in the present instance, through a nipple, or valve stem, 12 extending through the supporting structure 5 and the reinforcing bar 7. This fluid pressure within the casing will force the sections of the casing outwardly and cause the same to exert pressure on the tire which is to be cured. The abutting ends of adjacent segmental sections are preferably beveled, or provided with knife edges, as shown at 13, so that they will overlap, thus forming smooth joints between the adjacent segmental sections. Adjacent sections may be connected one to the other, if desired, in any suitable manner, and as here shown the abutting ends of adjacent segmental sections are provided with pivot lugs, or ears, 14 connected one to the other by pivot pins 15. In this manner permanent hinged connections are established, at all of the transverse joints except one. This one joint is non-radial and the inclination of the same is such that one segmental section can be moved inwardly about its pivot at that end opposite the inclined joint, thus enabling the annular casing to be collapsed and removed from the tire. At this inclined, or non-radial joint, the pivot pin, 16, is removable so that the pivot lugs 14 at that joint may be connected one to the other to secure the sections in annular form and may be removed to permit them to be collapsed.

It is desirable that both the longitudinal joints and the transverse joints of the casing should be provided with means, such as a suitable packing, to prevent the escape of the pressure fluid through the same. As here shown, I have arranged strips of flexible material 17, such as raw hide, treated to render it flexible, within the casing and overlapping the longitudinal joints in the sides of the casing. Preferably the edges of the strip 17 adjacent to the beads of the tire are firmly secured to the casing, as shown at 18. The strips of packing material are held in firm contact with the joints by means of longitudinally extending bars 19 which bear against them adjacent to the joints and which are pressed into firm engagement therewith by springs 20, each of which is secured at one end to one of the bars 19 and at other end to one of the sections 3 of the casing near the beaded tire. The action of the spring pressed bars is such as to maintain the strip of packing material in contact with the joint in all positions of the casing and thus prevent the escape of the air or steam through these joints. The transverse joints, at the abutting ends of the adjacent segmental sections are likewise closed by strips of packing material of a similar kind, as shown at 21. The transverse packing strips 21 are preferably formed in two parts, they being divided adjacent to the lines of division between the sections 2 and 3 of the casing so as to permit them to move with the respective sections. They are acted upon by the bars 19 which serve to hold them firmly in contact with the respective joints.

It will be understood that the supporting bar 5 and the reinforcing bar 7 constitute in effect a single support for the casing and may, if desired, be formed in a single piece, but I prefer to make them in two parts, as here shown, and to interpose between them a layer of packing material 22, such as raw hide, which will prevent the escape of fluid about the same. In order to increase the flexibility of the walls of the casing they may, if desired, be provided with grooves 23 extending lengthwise thereof and connected by transverse, or zig-zag, grooves 24. These grooves are pressed, or rolled, into the inner surface of the casing and greatly increase its flexibility without seriously detracting from its strength.

It will be apparent that cores of this kind can be very easily expanded and contracted within the tire and that practically the full pressure of the fluid introduced into the casing will be transmitted to the tire, which, it will be understood, is confined within an outer mold. The springs 10 and 11, while of sufficient strength to contract the casing are not of such strength as to materially resist the expansion of the casing under the action of the fluid under pressure. The device is simple in its construction and can be readily manufactured, it being apparent that the sectional construction of the casing not only contributes to its expansibility but also greatly facilitates the manufacture of the casing.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In an expansible metallic core, a tubular segmental casing shaped to fit within a tire and having relatively thin walls divided longitudinally along each side of said casing, a supporting member for the inner side portions of said casing, means to contract said casing, and means to limit the contracting movement of the sections of said casing.

2. In an expansible metallic core, a tubular segmental casing shaped to fit within a tire and having relatively thin walls divided longitudinally along each side of said casing, a supporting member arranged between and rigidly secured to the edges of the inner side portions of said casing, means to contract said casing, and means to limit the contracting movement of the sections of said casing.

3. In an expansible metallic core, a tubular segmental casing shaped to fit within a tire and having relatively thin walls divided longitudinally along each side of said casing, a supporting member for the inner side portions of said casing, means to contract said casing, and means to limit the contracting movement of the several sections of said casing.

4. In an expansible metallic core, a tubular segmental casing shaped to fit within a tire and having relatively thin walls divided longitudinally along each side of said casing, a supporting member for the inner side portions of said casing, means to contract said casing, and a stop arranged within said casing to limit the contracting movement of the several sections thereof.

5. In an expansible metallic core, a tubular segmental casing shaped to fit within a tire and having relatively thin walls divided longitudinally along each side of said casing, a supporting member for the inner side portions of said casing, means to contract said casing, and an annular stop mounted within said casing and arranged to limit the contracting movement of the several sections thereof.

6. In an expansible metallic core, a segmental casing shaped to fit within a tire and divided longitudinally along each side thereof, a supporting member for the inner side portions of said casing, springs acting on the several portions of said casing to contract the same, and means to limit the contracting movement of said portions of said casing.

7. In an expansible metallic core, a segmental casing shaped to fit within a tire and divided longitudinally along each side thereof, a supporting member for the inner side portions of said casing, a spring connected with the outer portion of said casing and with said supporting member, a second spring connected with the side portions of said casing, said springs being arranged to move the respective portions of said casing inwardly, and means to limit said movement of said portions of said casing.

8. In an expansible metallic core, a segmental casing shaped to fit within a tire and divided longitudinally along each side thereof, a supporting member for the inner side portions of said casing, a spring connected with the outer portion of said casing and with said supporting member, a second spring connected with the side portions of said casing, said springs being arranged to move the respective portions of said casing inwardly, and a ring mounted on said supporting member and arranged to limit the movement of said portions of said casing by said springs.

9. In an expansible metallic core, a segmental casing shaped to fit within a tire and divided longitudinally along each side thereof, a supporting member for the inner side portions of said casing, means to contract said casing, and packing strips overlapping the joints between the several sections of said casing.

10. In an expansible metallic core, a segmental casing shaped to fit within a tire and divided longitudinally along each side thereof, a supporting member for the inner side portions of said casing, means to contract said casing, packing strips overlapping the joints between the several sections of said casing, and springs acting on said packing to hold it firmly in contact with the inner surfaces of the sections of said casing.

11. In an expansible metallic core, a segmental casing shaped to fit within a tire and divided longitudinally along each side thereof, a supporting member for the inner side portions of said casing, means to contract said casing, strips of flexible material covering the joints in the respective sides of said casing, bars engaging said strips, and springs acting on said bars to press said strips into engagement with the side walls of said casing.

12. In an expansible metallic core, a plurality of segmental sections shaped to fit within a tire and adapted to form an annular core, said sections having their adjacent ends beveled and overlapping one another, each of said sections being divided longitudinally along each side thereof, longitudinal strips of flexible material overlapping the joints in the side walls of each section, circumferential strips of flexible material overlapping the joints between adjacent sections, bars extending lengthwise of said sections and engaging both the longitudinal and the circumferential strips of flexible material, and springs acting on said bars to cause them to hold said strips of flexible material in firm contact with the walls of said casing.

13. In an expansible metallic core, a supporting structure arranged adjacent to the positions occupied by the beads of the tire, a casing comprising side members secured to said supporting member and each extending for a portion of the circumference of said tire, said casing also comprising an outer section corresponding to the tread portion of said tire and having its edges overlapping the respective side portions of said casing, and means for controlling the relative movements of said sections of said casing.

14. In an expansible metallic core, a rigid supporting member arranged adjacent to the positions occupied by the beads of the tire, a casing comprising side members rigidly secured to said supporting member, a reinforcing member arranged within said casing adjacent to the positions occupied by the beads of said tire and rigidly secured to said side members, packing material arranged between said supporting member and said reinforcing member, said casing also comprising an outer section conforming to the tread portion of said tire and having its respective lateral edges overlapping the edges of said side portions, springs acting on said sections to move them one toward the other, and means to limit the movement of said sections by said springs.

15. In an expansible metallic core, a segmental casing shaped to fit within a tire and divided longitudinally along each side thereof, a supporting member for the inner side portions of said casing, and means to limit the inward movement of the several sections of said casing, said casing having its inner surface provided with grooves to increase the flexibility thereof.

16. In an expansible metallic core, a segmental casing shaped to fit within a tire and divided longitudinally along each side thereof, a supporting mmeber for the inner side portions of said casing, and means to limit the inward movement of the several sections of said casing, said casing having its inner surface provided with a plurality of longitudinal grooves, and transverse grooves communicating with said longitudinal grooves.

17. In an expansible core, a tubular segmental casing shaped to fit within a tire and having relatively thin walls divided longitudinally along each side of said casing between the tread and the bead of the tire, the inner section of said casing having rigid parts to fit between the beads of the tire, means to contract said casing, and means to limit the contracting movement of the sections of said casing.

18. In an expansible core, a tubular segmental casing shaped to fit within a tire and having relatively thin walls divided longitudinally along each side of said casing between the tread and the bead of the tire, the inner section of said casing having rigid parts to fit between the beads of the tire, means to contract said casing, and an annular stop mounted within said casing to limit the contracting movement of the sections thereof.

19. In an expansible core, a segmental casing shaped to fit within a tire and divided longitudinally along each side thereof between the tread and the bead of the tire, the inner section of said casing having rigid parts to fit between the beads of the tire, a spring connected with the inner and outer portions of said casing, a second spring connected with the side portions of said casing, said springs being arranged to move the respective portions of said casing inwardly, and means to limit the inward movement of said portions of said casing.

20. In an expansible core, a segmental casing shaped to fit within a tire and divided longitudinally along each side thereof between the tread and the bead of the tire, a spring connected with the inner and outer portions of said casing, a second spring connected with the side portions of said casing, said springs being arranged to move the respective portions of said casing inwardly, means to limit the inward movement of said portions of said casing, packing strips overlapping the joints between the inner and outer portions of said casing, and springs acting on said packing strips to hold them firmly in contact with said joints.

21. In an expansible core, a segmental casing shaped to fit within a tire and divided longitudinally along each side thereof between the tread and the bead of the tire, the inner section of said casing having rigid parts to fit between the beads of the tire, a spring connected with the inner and outer portions of said casing, a second spring connected with the side portions of the said casing, said springs being arranged to move the respective portions of said casing inwardly, and means to limit the inward movement of said portions of said casing, said casing having its inner surface provided with grooves to increase the flexibility thereof.

In testimony whereof, I affix my signature hereto.

PAUL R. ERICH LEHMANN.